US009727235B2

(12) United States Patent
Cromer et al.

(10) Patent No.: US 9,727,235 B2
(45) Date of Patent: Aug. 8, 2017

(54) SWITCHING AN INTERFACE MODE USING AN INPUT GESTURE

(71) Applicant: LENOVO (Singapore) PTE, LTD., New Tech Park (SG)

(72) Inventors: Daryl Cromer, Cary, NC (US); Howard Locker, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 175 days.

(21) Appl. No.: 14/104,839

(22) Filed: Dec. 12, 2013

(65) Prior Publication Data

US 2015/0169218 A1    Jun. 18, 2015

(51) Int. Cl.
   G06F 3/044        (2006.01)
   G06F 3/0488       (2013.01)
   G06F 3/01         (2006.01)

(52) U.S. Cl.
   CPC .......... *G06F 3/04886* (2013.01); *G06F 3/017* (2013.01); *G06F 3/044* (2013.01); *G06F 3/04883* (2013.01)

(58) Field of Classification Search
   CPC ...... G06F 3/017; G06F 3/04886; G06F 3/044; G06F 3/04883
   See application file for complete search history.

(56) References Cited

U.S. PATENT DOCUMENTS

| 2003/0100965 | A1* | 5/2003 | Sitrick | G09B 15/023 700/83 |
| 2006/0209040 | A1* | 9/2006 | Garside | G06F 3/03545 345/173 |
| 2006/0238517 | A1* | 10/2006 | King | G06F 1/1626 345/173 |
| 2009/0167706 | A1 | 7/2009 | Tan et al. | |
| 2010/0302172 | A1* | 12/2010 | Wilairat | G06F 3/04883 345/173 |
| 2010/0315337 | A1 | 12/2010 | Ferren et al. | |
| 2011/0209088 | A1* | 8/2011 | Hinckley | G06F 3/0488 715/810 |
| 2011/0242138 | A1* | 10/2011 | Tribble | G06F 3/04886 345/663 |
| 2012/0066591 | A1* | 3/2012 | Hackwell | G06F 3/0483 715/702 |
| 2012/0068937 | A1* | 3/2012 | Backlund | G06F 3/0237 345/173 |
| 2013/0063362 | A1* | 3/2013 | Papakipos | G06F 1/1626 345/173 |

(Continued)

FOREIGN PATENT DOCUMENTS

| CN | 101635764 A | 1/2010 |
| CN | 101943985 A | 1/2011 |

(Continued)

*Primary Examiner* — William Bashore
*Assistant Examiner* — Daniel Parcher
(74) *Attorney, Agent, or Firm* — Kunzler Law Group (57) ABSTRACT

A method, apparatus, and program product are disclosed for presenting an interactive interface on an electronic display of an information handling device, the interactive interface comprising a plurality of modes, receiving an input gesture from a user, the input gesture detected along a surface of the information handling device by a gesture detector, and changing a mode of the interactive interface in response to the received input gesture.

12 Claims, 8 Drawing Sheets

(56) References Cited

U.S. PATENT DOCUMENTS

| | | | | |
|---|---|---|---|---|
| 2013/0212515 A1* | 8/2013 | Eleftheriou | ......... | G06F 3/04886 715/773 |
| 2013/0300697 A1* | 11/2013 | Kim | ...................... | G06F 1/1626 345/173 |
| 2014/0028562 A1* | 1/2014 | St. Clair | ............... | G06F 3/0488 345/168 |
| 2014/0078086 A1* | 3/2014 | Bledsoe | .................. | G06F 3/041 345/173 |
| 2014/0123049 A1* | 5/2014 | Buxton | ............... | G06F 3/04883 715/773 |
| 2014/0218330 A1* | 8/2014 | Ady | ..................... | H03K 17/962 345/174 |
| 2014/0359513 A1* | 12/2014 | Starner | ............... | G06F 3/04886 715/773 |
| 2014/0362001 A1* | 12/2014 | Westerman | ............. | G06F 3/041 345/173 |
| 2015/0160849 A1* | 6/2015 | Weiss | ...................... | G06F 3/044 345/174 |

FOREIGN PATENT DOCUMENTS

| | | |
|---|---|---|
| CN | 102084325 A | 6/2011 |
| CN | 102713794 A | 10/2012 |
| CN | 103309573 A | 9/2013 |

\* cited by examiner

SWITCHING AN INTERFACE MODE USING AN INPUT GESTURE

BACKGROUND

Field

The subject matter disclosed herein relates to gesture input and more particularly relates to switching a mode of an interactive interface using an input gesture.

Description of the Related Art

Some information handling devices, such as smart phones, tablet computers, etc., include interactive interface features that a user can interact with using a touch input, gesture input, etc. In certain instances, the interactive interface features include different modes that may be switched by interacting with an element on the interface features, such as a button. For example, a virtual keyboard may include different keyboard layout modes (e.g., letters, numbers, symbols, etc.) that may be changed by pressing a mode-switching button on the keyboard.

However, in some situations, it may be difficult to press the mode-switching button due to the size of the button, location of the button, etc. It may be beneficial, therefore, to provide a way to switch an interface mode using an input gesture, such as a touch gesture, hover gesture, etc. instead of interacting directly with the mode-switching features of the interactive interface.

BRIEF SUMMARY

A method for switching an interface mode using an input gesture is disclosed. An apparatus and computer program product also perform the functions of the method.

In one embodiment, a method is described that includes presenting an interactive interface on an electronic display of an information handling device. In another embodiment, the interactive interface includes a plurality of modes. In some embodiments, the method includes receiving an input gesture from a user. In certain embodiments, the input gesture is detected along a surface of the information handling device by a gesture detector. In a further embodiment, the method includes changing a mode of the interactive interface in response to the received input gesture.

In another embodiment, the interactive interface comprises a virtual keyboard that includes a plurality of keyboard modes. In certain embodiments, the input gesture includes one or more of a touch gesture and a hover gesture. The input gesture, in one embodiment, includes a sliding gesture along an edge of the information handling device such that a sliding gesture in a first direction changes a first mode to a second mode and a sliding gesture in a second direction changes the second mode to the first mode. In another embodiment, a sliding gesture in a first direction changes a second mode to a third mode and a sliding gesture in a second direction changes the third mode to the second mode. In one embodiment, the first direction is opposite of the second direction. In some embodiments, a sliding gesture in a first direction changes a second mode to a third mode and a sliding gesture in a second direction changes the third mode to the second mode, the first direction being opposite the second direction.

In certain embodiments, the input gesture comprises a tapping gesture, wherein a tap along a first edge of the information handling device changes a first mode to a second mode and a tap along a second edge of the information handling device changes the second mode to the first mode. In another embodiment, a tap along a first edge of the information handling device changes a second mode to a third mode and a tap along a second edge of the information handling device changes the third mode to the second mode. In one embodiment, the first edge is opposite of the second edge. In a further embodiment, the input gesture is detected along a border of the electronic display. In another embodiment, the input gesture changes a mode of the interactive interface from a last mode to a first mode and from a first mode to a last mode. In certain embodiments, the input gesture includes a touch gesture and/or a hover gesture.

In one embodiment, the method includes adjusting a mode-changing configuration in response to detecting modification of an orientation of the information handling device. In another embodiment, the gesture detector includes a capacitive sensor that is operatively coupled an edge of the information handling device and/or a border of the electronic display. In another embodiment, the method includes enabling and/or disabling detection of an input gesture. In certain embodiments, the gesture detector is selectively turned on and off. In another embodiment, the method includes defining one or more input gestures as mode-changing input gestures.

The apparatus, in one embodiment, includes a gesture detector, a processor, a display operatively coupled to the processor, and a memory storing machine readable code executable by the processor. In one embodiment, the machine readable code includes a display module configured to present an interactive interface on the display of the information handling device. In some embodiments, the interactive interface includes a plurality of modes. In another embodiment, the machine readable code includes a gesture module configured to receive an input gesture from a user. In one embodiment, the input gesture is detected along a surface of the information handling device by a gesture detector. In another embodiment, the machine readable code includes a mode module configured to change a mode of the interactive interface in response to the received input gesture.

In one embodiment, the interactive interface comprises a virtual keyboard that includes a plurality of keyboard modes. The input gesture, in one embodiment, includes a sliding gesture along an edge of the information handling device such that a sliding gesture in a first direction changes a first mode to a second mode and a sliding gesture in a second direction changes the second mode to the first mode. In another embodiment, a sliding gesture in a first direction changes a second mode to a third mode and a sliding gesture in a second direction changes the third mode to the second mode. In one embodiment, the first direction is opposite of the second direction.

In certain embodiments, the input gesture comprises a tapping gesture, wherein a tap along a first edge of the information handling device changes a first mode to a second mode and a tap along a second edge of the information handling device changes the second mode to the first mode. In another embodiment, a tap along a first edge of the information handling device changes a second mode to a third mode and a tap along a second edge of the information handling device changes the third mode to the second mode. In one embodiment, the first edge is opposite of the second edge.

In a further embodiment, the input gesture is detected along a border of the electronic display. In certain embodiments, the input gesture includes a touch gesture and/or a hover gesture. In another embodiment, the machine readable code includes a configuration module configured to adjust a mode-changing configuration in response to detecting modification of an orientation of the information handling device. In one embodiment, the machine readable code includes a detector enabling module configured to one of enable and disable detection of the input gesture. In certain embodiments, the gesture detector is selectively turned on and off. In yet another embodiment, the machine readable code includes a gesture assignment module configured to define one or more input gestures as mode-changing input gestures.

A program product is disclosed including a computer readable storage medium storing machine readable code executable by a processor to perform the operations. In one embodiment, the operations include presenting an interactive interface on an electronic display of an information handling device, the interactive interface comprising a plurality of modes. In a further embodiment, the operations include receiving an input gesture from a user, the input gesture detected along a surface of the information handling device by a gesture detector. In another embodiment, the operations include changing a mode of the interactive interface in response to the received input gesture.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device.

Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as JAVA®, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Figure 1:
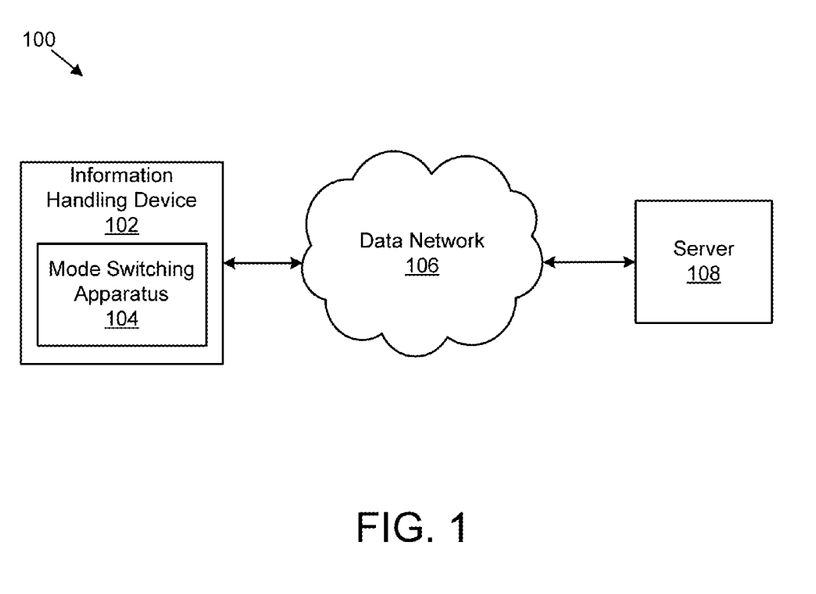
FIG. 1 is a schematic block diagram illustrating one embodiment of a system for switching an interface mode using an input gesture.

Descriptions of Figures may refer to elements described in previous Figures, like numbers referring to like elements. FIG. 1 depicts one embodiment of a system 100 for switching an interface mode using an input gesture. In one embodiment, the system 100 includes an information handling device 102, a mode switching apparatus 104, a data network 106, and a server 108, which are described in more detail below.

In one embodiment, the system 100 includes an information handling device 102. In some embodiments, the information handling device 102 includes a mobile device, such as a smart phone, a tablet computer, a PDA, a smart watch, and/or the like. In certain embodiments, the information handling device 102 includes a laptop computer, a desktop computer, a server, a monitor, a smart TV, various input devices, such as a trackpad, a mouse, a remote control, and/or the like. The information handling device 102, in certain embodiments, includes a touch-enabled display that recognizes and receives input from a touch input device, such as a stylus, a user's finger, and/or the like. In another embodiment, the information handling device 102 receives gesture input from a gesture input detector, such as a capacitive sensor, embedded around an edge of the device, around the device display, and/or along any other surface of the information handling device 102. In certain embodiments, the gesture detector detects gesture input from a user, such as a swiping gesture, a tap gesture, a pressure gesture, a hover gesture, and/or the like.

In one embodiment, the system 100 includes a mode switching apparatus 104, which is configured to present an interactive interface on an electronic display of an information handling device 102. In one embodiment, the interactive interface includes a plurality of modes. In another embodiment, the mode switching apparatus 104 receives an input gesture from a user, which is detected along a surface of the information handling device 102 by a gesture detector. The mode switching apparatus 104, in a further embodiment changes the mode of the interactive interface in response to the received input gesture. The mode switching apparatus 104, in one embodiment, includes one or more modules that perform the operations associated with enhancing a viewing area around a cursor. The mode switching apparatus 104, including its associated modules, are described in more detail below with reference to FIGS. 2 and 3.

In another embodiment, the system 100 includes a data network 106. The data network 106, in certain embodiments, is a digital communication network 106 that transmits digital communications. The digital communication network 106 may include a wireless network, such as a wireless telephone network, a local wireless network, such as a Wi-Fi network, and the like. The digital communication network 106 may include a wide area network ("WAN"), a storage area network ("SAN"), a local area network ("LAN"), an optical fiber network, the internet, or other digital communication network known in the art. The digital communication network 106 may include two or more networks. The digital communication network 106 may include one or more servers, routers, switches, and/or other networking equipment. The digital communication network 106 may also include computer readable storage media, such as a hard disk drive, an optical drive, non-volatile memory, random access memory ("RAM"), or the like.

The system 100, in another embodiment, includes a server 108. The server 108, in some embodiments, includes a main frame computer, a desktop computer, a laptop computer, a cloud server, and/or the like. In certain embodiments, the server 108 stores data that is accessed by an information handling device 102 through the data network 106.

Figure 2:
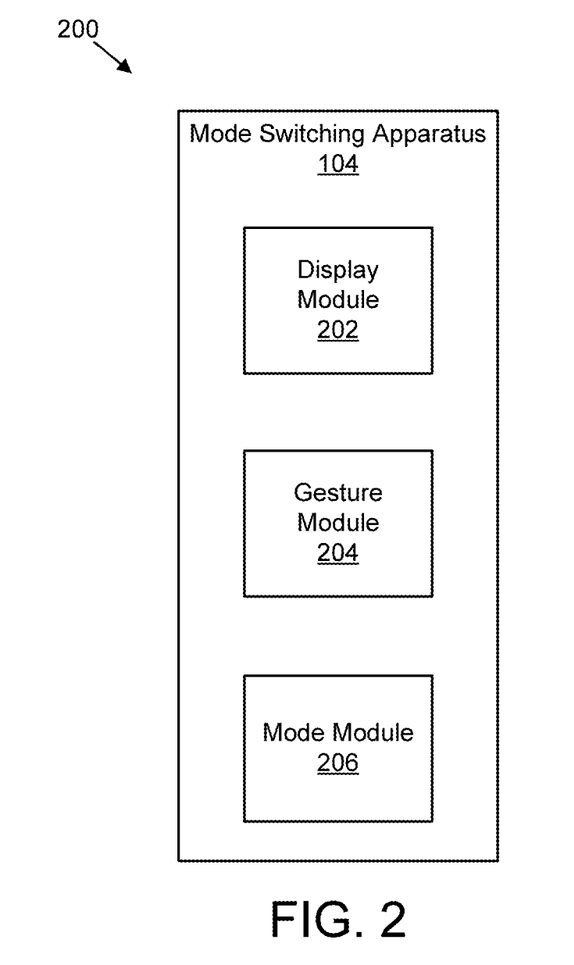
FIG. 2 is a schematic block diagram illustrating one embodiment of an apparatus for switching an interface mode using an input gesture.

FIG. 2 depicts one embodiment of an apparatus 200 for switching an interface mode using an input gesture. In certain embodiments, the apparatus 200 includes a mode switching apparatus 104. The mode switching apparatus 104, in another embodiment, includes a display module 202, a gesture module 204, and a mode module 206, which are described below in more detail.

The mode switching apparatus 104, in one embodiment, includes a display module 202 configured to present an interactive interface on an electronic display of an information handling device 102. In another embodiment, the interactive interface includes a plurality of modes. In certain embodiments, the interactive interface includes a virtual keyboard presented on the electronic display of the information handling device 102. The virtual keyboard, in certain embodiments, includes a plurality of keyboard modes. For example, one keyboard mode of the virtual keyboard may display letters, another keyboard mode may display numbers, and yet another keyboard mode may display symbols. Similarly, the virtual keyboard may include a shift-key mode, caps-lock mode, and/or the like. In certain embodiments, the interactive interface may switch between different modes based on input received from a user.

In another embodiment, the mode switching apparatus 104 includes a gesture module 204 configured to receive an input gesture from a user. In certain embodiments, the input gesture is detected along a surface of the information handling device 102 by a gesture detector. In some embodiments, the gesture module 204 uses a capacitive sensor embedded beneath a surface of the information handling device 102 to recognize various input gestures, such as swiping gestures, tapping gestures, hover gestures, and/or the like. For example, the capacitive sensor may be embedded along an edge of a smart phone, or along a border surrounding the display of a tablet computer. One of skill in the art will recognize other types of sensors that could be used to detect input gestures. In certain embodiments, the gesture module 204 receives an input gesture detected by the gesture detector through a cover selectively coupled to the information handling device 102.

In one embodiment, the mode switching apparatus 104 includes a mode module 206 configured to change a mode of an interactive interface in response to the input gesture received be the gesture module 204. For example, a user may swipe up along an edge of a smart phone, which would trigger the mode module 206 to change the mode of a virtual keyboard being displayed on the smart phone display (e.g., change the virtual keyboard from displaying a letter layout to a number layout). Alternatively, the user may tap either the bottom or the top of a tablet computer, which would be sensed by the capacitive sensor, and would trigger the mode module 206 to change a mode of the interactive interface.

In some embodiments, the received input gesture includes a sliding gesture detected along an edge of the information handling device 102 such that a sliding gesture in a first direction triggers the mode module 206 to change a first mode of the interactive interface to a second mode and a sliding gesture in a second direction changes the second mode to the first mode. In certain embodiments, the first direction is opposite of the second direction, e.g., sliding up on the right hand side of a smart phone causes the virtual keyboard layout to change from letters to numbers and sliding down on the left hand side of the smart phone cause the virtual keyboard layout to change from numbers to letters. Further, the mode module 206, in response to a sliding gesture in a first direction, changes a second mode to a third mode, a third mode to a fourth mode, and so on. In one embodiment, the mode module 206 returns the interactive interface to the first mode in response to receiving a sliding gesture in a first direction. For example, an interactive interface may have three modes, and when the interface is on the third mode, a sliding gesture intended to change the interface mode to a fourth mode, which does not exist, will change the interface mode back to the first mode. Alternatively, from the first mode, a sliding gesture in the second direction may change the interface mode to the last mode.

In another embodiment, the received input gesture includes a tapping gesture such that a tap along a first edge of the information handling device 102 changes a first mode to a second mode and a tap along a second edge of the information handling device 102 changes the second mode to the first mode. In certain embodiments, the first edge is opposite of the second edge. For example, tapping on the right hand side of a smart phone causes the virtual keyboard layout to change from letters to numbers and tapping on the left hand side of the smart phone cause the virtual keyboard layout to change from numbers to letters. Similar to the above example, the mode module 206, in response to a tapping gesture along a first edge, changes a second mode to a third mode, a third mode to a fourth mode, and so on. In one embodiment, the mode module 206 returns the interactive interface to the first mode in response to receiving a tapping gesture along a first edge. For example, an interactive interface may have three modes, and when the interface is on the third mode, a tapping gesture intended to change the interface mode to a fourth mode, which does not exist, will change the interface mode back to the first mode. Alternatively, from the first mode, a tapping gesture along the second edge may change the interface mode to the last mode.

Figure 3:
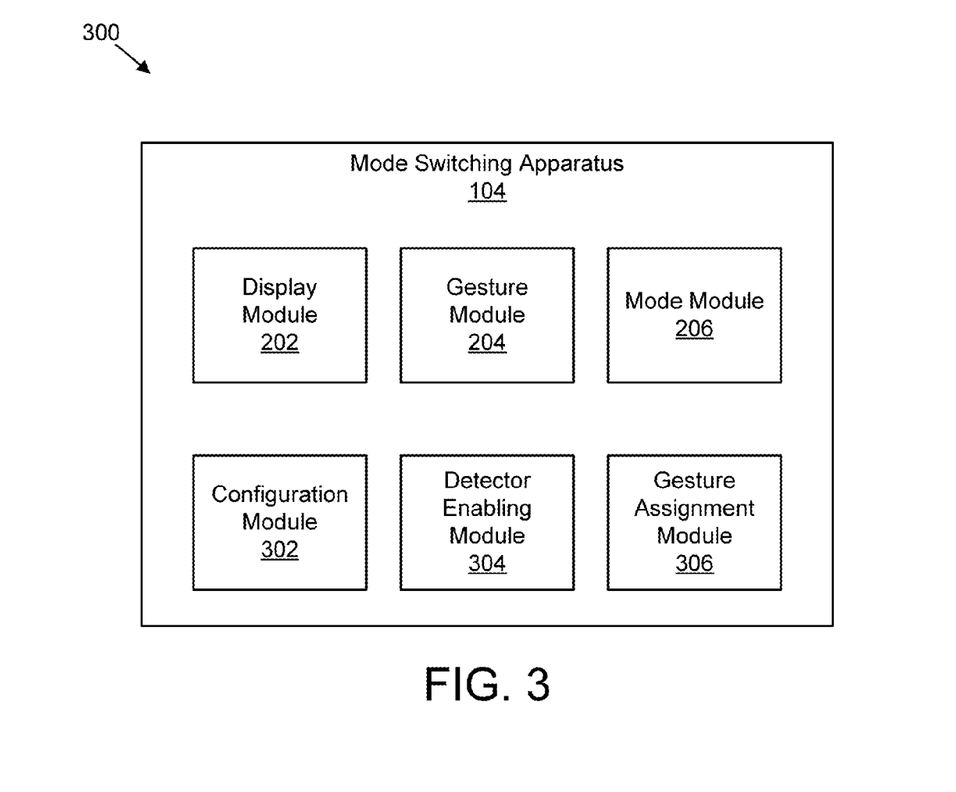
FIG. 3 is a schematic block diagram illustrating another embodiment of an apparatus for switching an interface mode using an input gesture.

FIG. 3 depicts one embodiment of an apparatus 300 for switching an interface mode using an input gesture. In certain embodiments, the apparatus 300 includes a mode switching apparatus 104. The mode switching apparatus 104, in one embodiment, includes a display module 202, a gesture module 204, and a mode module 206, which are substantially similar to the display module 202, gesture module 204, and mode module 206 described with reference to FIG. 2. The mode switching apparatus 104, in a further embodiment, includes a configuration module 302, a detector enabling module 304, and a gesture assignment module 306, which are described below in more detail.

The mode switching apparatus 104, in one embodiment, includes a configuration module 302 configured to adjust a mode-changing configuration in response to detecting modification of an orientation of the information handling device 102. For example, with a smart phone held in a horizontal position, tapping the top or bottom of the smart phone may change the mode of a virtual keyboard displayed on the smart phone; however, if the orientation of the phone is changed from a horizontal to a vertical position, the configuration module 302 adjusts the mode-changing configuration such that the new top and bottom, when tapped, will change the mode of the virtual keyboard. In certain embodiments, the configuration module 302 uses an accelerometer, or other device embedded in the information handling device 102 that detects changes in acceleration and position, to detect when to adjust the mode-changing configuration of the information handling device 102.

In another embodiment, the mode switching apparatus 104 includes a detector enabling module 304 configured to enable and disable detection of the input gesture. In certain embodiments, the detector enabling module 304 selectively turns the gesture detector on and off. In another embodiment, the detector enabling module 304 determines in software running on the information handling device 102 whether to recognize input gestures detected by the gesture detector. For example, a user may configure the information handling device 102 in the software settings to either recognize or not recognize input gestures detected by the gesture detector. Alternatively, the user may turn the gesture detector on and off through the information handling device's 102 settings or by using a physical switch, button, or the like, located on the body of the information handling device 102.

In yet another embodiment, the mode switching apparatus 104 includes a gesture assignment module 306 configure to define one or more input gestures as mode-changing input gestures. For example, the gesture assignment module 306 may define a sliding gesture as a virtual keyboard layout mode switching gesture. Alternatively, the gesture assignment module 306 may define a tapping gesture to turn on and off a caps-lock mode on the virtual keyboard. In certain embodiments, the gesture assignment module 306 receives an input gesture from a user and allows the user to specify an action associated with the input gesture.

In one embodiment, the gesture assignment module 306 may put the information handling device 102 in a gesture definition mode. In the gesture definition mode, in another embodiment, the gesture assignment module 306 receives a customized gesture from a user and presents a list of one or more actions associated with the information handling device 102 that the user can select to assign the gesture to. For example, in the gesture definition mode, the user may input a sliding gesture along a bottom edge of a smart phone and associate that action with switching a keyboard layout mode of a virtual keyboard. In some embodiments, the gesture definition module 306 recognizes one or more input gestures received by the gesture module 204 as a mode-changing gesture. Thus, if a gesture is received that is not recognized by the gesture assignment module 306 as a mode changing gesture, the received gesture may be ignored.

Figure 4:
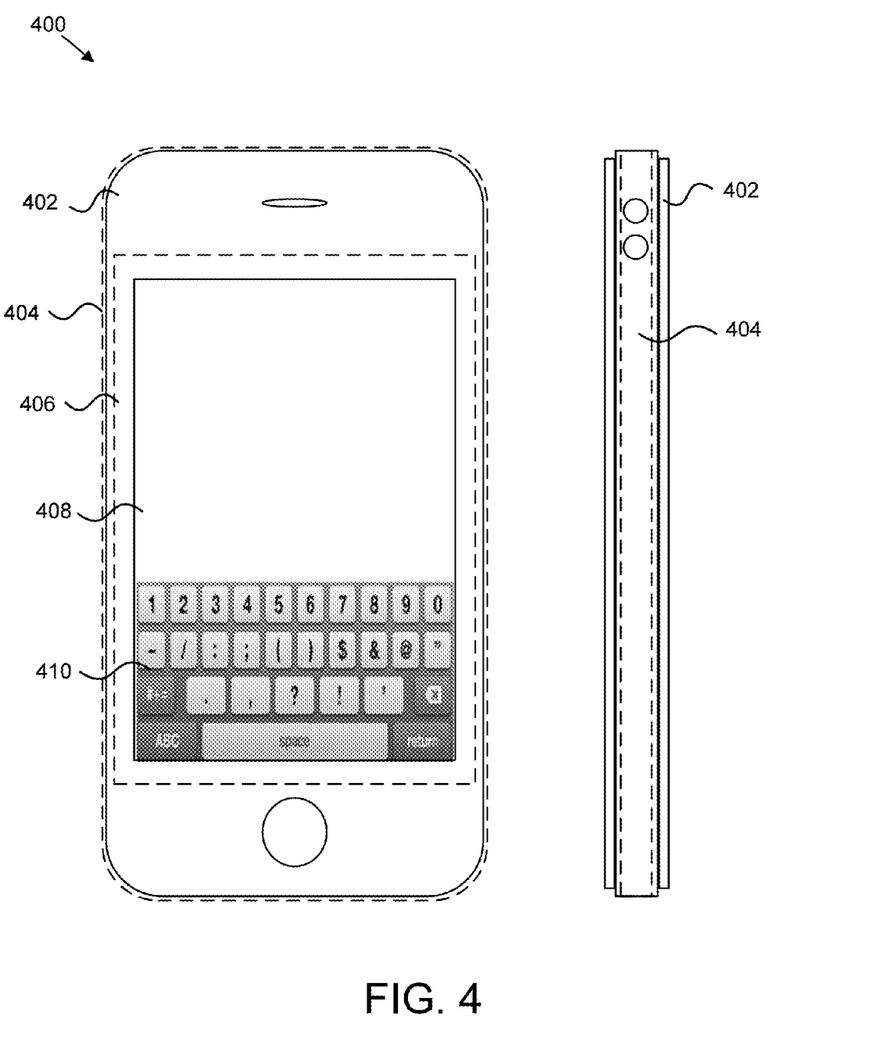
FIG. 4 illustrates one embodiment of an information handling device with a gesture detector.

FIG. 4 illustrates one embodiment 400 of an information handling device 402 with a gesture detector 404, 406. In one embodiment, the information handling device 402 includes a gesture detector 404 along the outside surface of the body of the information handling device 402. In another embodiment, a gesture detector 406 is located under the surface of the information handling device 102 around the border of the display 408. In one embodiment, the gesture detector 404, 406 includes a capacitive sensor. One of skill in the art will recognize other gesture detection sensors that may be used within the information handling device 102. In one embodiment, in response to a user interacting with a gesture detector 404, 406, a mode of an interactive interface is switched. Thus, in the depicted embodiment, a keyboard mode of the virtual keyboard 410 is switched in response to a user interacting with the gesture detector 404, 406 using a mode-switching input gesture. In certain embodiments, the information handling device 402 includes both the gesture detector 404 along the edge of the information handling device 402 and the gesture detector 406 around the border of the display 408. In another embodiment, the information handling device 402 only includes one of the gesture detectors 404, 406.

Figure 5:
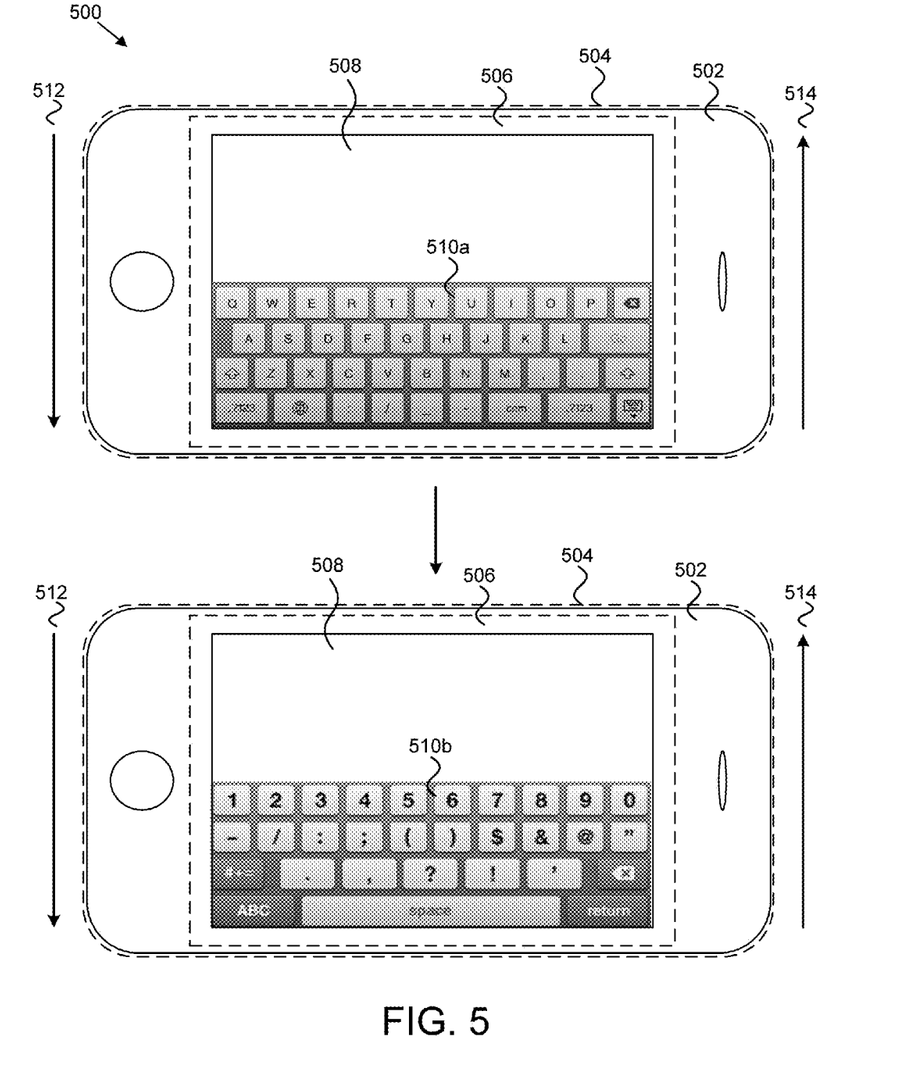
FIG. 5 illustrates one embodiment of switching an interface mode using an input gesture.

FIG. 5 illustrates one embodiment 500 of switching an interface mode using an input gesture. In one embodiment, the information handling device 502 includes a gesture detector 504 along the edge of the device 502 and/or a gesture detector 506 around the border of the display 508. In one embodiment, a display module 202 displays an interactive interface on the display 508, which in this case includes a virtual keyboard in a letter-display layout mode 510*a*. In the depicted embodiment, a gesture module 204 receives an input gesture from a user, such as a down-sliding gesture 512 or an up-sliding gesture 514.

In one embodiment, in response to the gesture module 204 receiving a sliding gesture 512, 514 from a user, the mode module 206 switches the mode of the virtual keyboard. Thus, in the depicted embodiment, the mode module 206 changes the layout mode from a letter-display layout mode 510*a* to a number-display layout mode 510*b*. In one embodiment, a sliding gesture input in the opposite direction will change the layout mode back to the letter-display mode 510*a*. If the virtual keyboard, in some embodiments, includes a plurality of modes, the mode module 206 flips through the different modes of the virtual keyboard in response to an input gesture.

Figure 6:
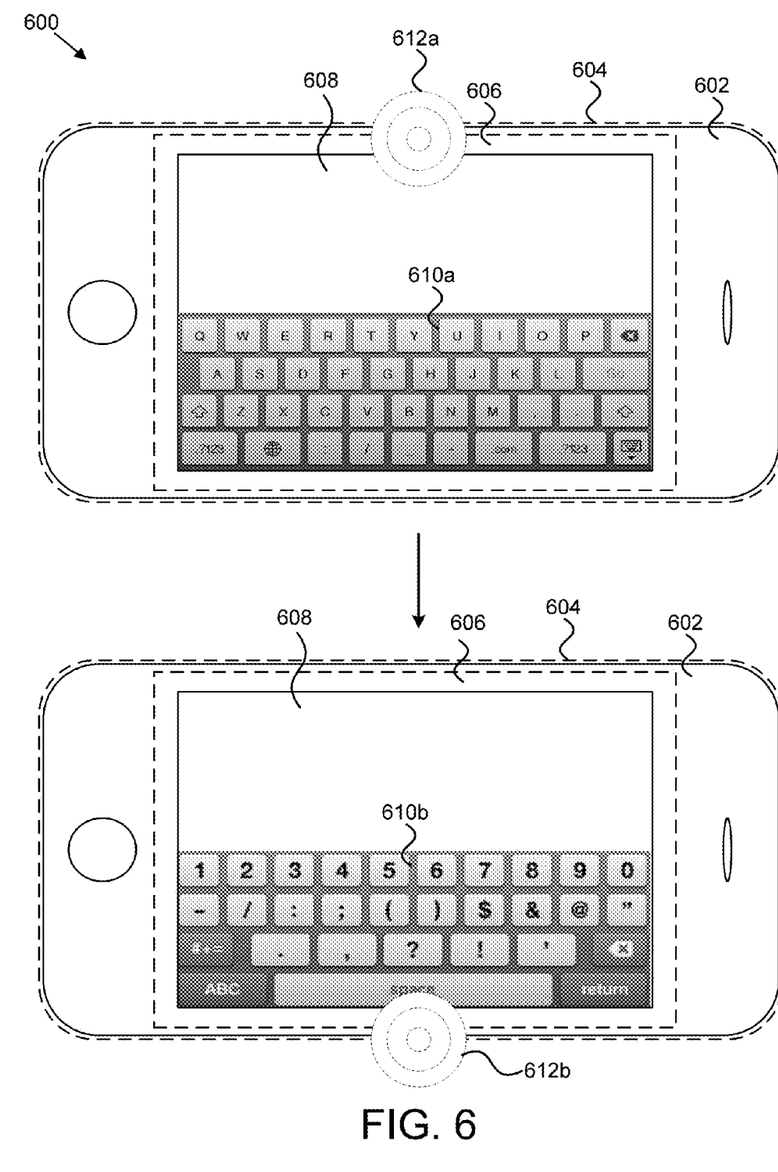
FIG. 6 illustrates one embodiment of switching an interface mode using another input gesture.

FIG. 6 illustrates one embodiment 600 of switching an interface mode using another input gesture. In certain embodiments, the input gesture received by the gesture module 204 includes a tapping gesture 612a, 612b detected by a gesture detector 604, 606. The tapping gesture 612a, 612b, may be received on any surface of the information handling device 602 configured to receive tapping gestures 612a, 612b. In a further embodiment, a tapping gesture 612a, 612b changes a mode of the interactive interface, e.g., a virtual keyboard, presented on a display 608 of the information handling device 602. For example, a tapping gesture 612a received near the top edge of the information handling device 602 may switch the virtual keyboard from a letter-display mode 610a to a number-display mode 610b. Further, a tapping gesture 612b received near the bottom edge of the information handling device 602 may switch the virtual keyboard from a number-display mode 610b back to a letter-display mode 610a. Alternatively, the tapping gesture 612a, 612b may change the virtual keyboard mode by enabling and/or disabling the shift key, a caps-lock mode, and/or the like. In some embodiments, in order to flip through the various modes of the interactive interface, the tapping gestures 612a, 612b are performed on opposite edges of the information handling device 602.

Figure 7:
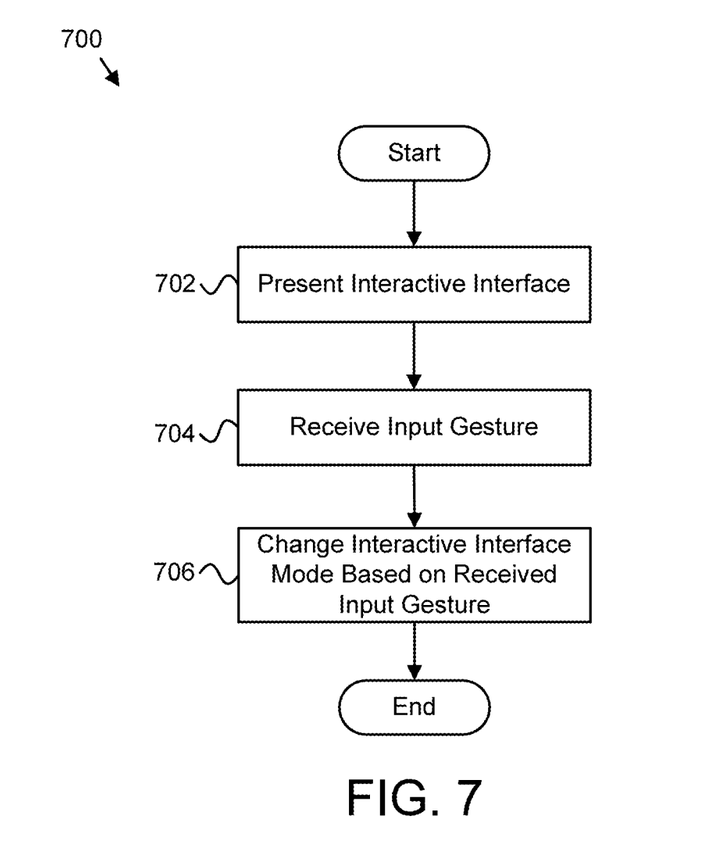
FIG. 7 is a schematic flow chart diagram illustrating one embodiment of a method for switching an interface mode using an input gesture.

FIG. 7 depicts one embodiment of a method 700 for switching an interface mode using an input gesture. In one embodiment, the method 700 begins and a display module 202 presents 702 an interactive interface on a display of an information handling device 102. In certain embodiments, the interactive display includes a plurality of modes. A gesture module 204, in another embodiment, receives 704 an input gesture from a user. In certain embodiments, the input gesture is detected along a surface of the information handling device 102 by a gesture detector. In a further embodiment, a mode module 206 changes 706 a mode of the interactive interface in response to the received input gesture and the method 700 ends.

Figure 8:
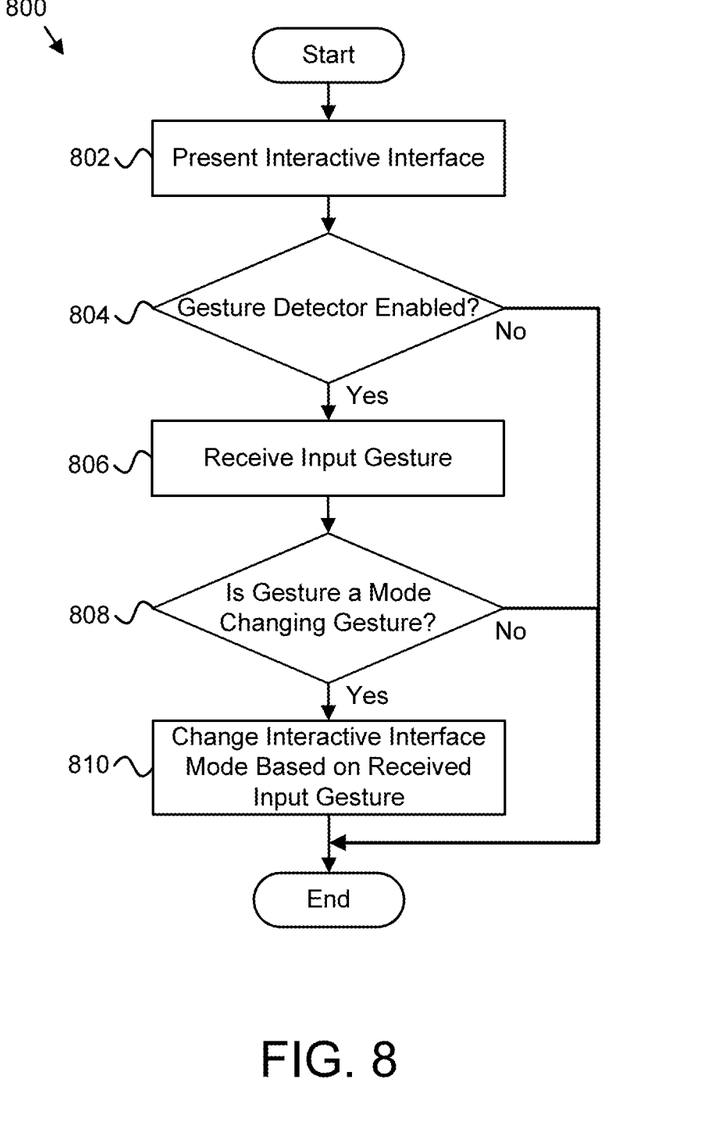
FIG. 8 is a schematic flow chart diagram illustrating another embodiment of a method for switching an interface mode using an input gesture.

FIG. 8 depicts another embodiment of a method 800 for switching an interface mode using an input gesture. In one embodiment, the method 800 begins and a display module 202 presents 802 an interactive interface on a display of an information handling device 102. In certain embodiments, the interactive display includes a plurality of modes. For example, a virtual keyboard may include different keyboard layout modes, such as a letter-layout mode, a number-layout mode, a symbol-layout mode, and/or the like. Alternatively, the virtual keyboard may change modes in response to a shift key, a caps lock key, or the like being enabled.

In one embodiment, a detector enabling module 304 determines 804 whether the gesture detector is enabled. In one embodiment, if the detector enabling module 304 determines 804 the gesture detector is not enabled, the method 800 ends. Alternatively, in another embodiment, if the detector enabling module 304 determines 804 the gesture detector is enabled, a gesture module 204 receives 806 input gesture from a user. In certain embodiments, the input gesture includes a sliding gesture, a tapping gesture, a hover gesture, and/or the like.

In another embodiment, a gesture assignment module 306 determines 808 whether the gesture is a mode changing gesture. In one embodiment, if the gesture assignment module 306 determines 808 the gesture is not a mode changing gesture, i.e., the received gesture is not defined as a mode changing gesture, the method 800 ends. Otherwise, in another embodiment, if the gesture assignment module 306 determines 808 the received gesture is a mode changing gesture, a mode module 206 changes 810 a mode of the interactive interface in response to the received input gesture. For example, a virtual keyboard in a letter-display layout mode may be changed 810 to a number-display layout mode in response to a sliding gesture received along an edge of the information handling device 102. And the method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
presenting an interactive interface on an electronic display of an information handling device, the interactive interface comprising a virtual keyboard having a plurality of modes;
receiving an input gesture from a user, the input gesture detected on a surface of the information handling device by a gesture detector, the gesture detector comprising a capacitive sensor operatively coupled to a border surrounding the electronic display, the border located outside a touch-sensitive area of the electronic display and within a same plane of the electronic display, the input gesture comprising a tapping gesture; and
changing a mode of the interactive interface in response to the received tapping gesture, wherein, without providing an indication to a user of which side of the information handling device to interact with to change the mode of the interactive interface, the mode of the interactive interface is changed from a first mode to a second mode in response to the tapping gesture detected on a top side of the border according to an orientation of the information handling device as held by the user, and the mode of the interactive interface is changed from the second mode to the first mode in response to the tapping gesture detected on a bottom side of the border according to the orientation of the information handling device as held by the user, the top side being opposite the bottom side.

2. The method of claim 1, wherein the input gesture comprises one or more of a touch gesture and a hover gesture.

3. The method of claim 1, wherein the input gesture further comprises a sliding gesture on a side of the border such that a sliding gesture in a first direction changes the first mode to the second mode and a sliding gesture in a second direction changes the second mode to the first mode, the first direction being opposite the second direction.

4. The method of claim 3, wherein a second sliding gesture in the first direction changes the second mode to a third mode and a second sliding gesture in the second direction changes the third mode to the second mode, the first direction being opposite the second direction.

5. The method of claim 1, wherein a tap on a first side of the border changes a second mode to a third mode and a tap on a second side of the border changes the third mode to the second mode, the first side being opposite the second side.

6. The method of claim 1, further comprising adjusting a mode-changing configuration in response to detecting modification of an orientation of the information handling device.

7. The method of claim 1, further comprising one of enabling and disabling detection of the input gesture, wherein the gesture detector is selectively turned on and off.

8. The method of claim 1, further comprising defining one or more input gestures as mode-changing input gestures.

9. An apparatus comprising:
a gesture detector;
a processor;
a display operatively coupled to the processor; and
a memory storing machine readable code executable by the processor, the machine readable code comprising:
  a display module that presents an interactive interface on the display, the interactive interface comprising a virtual keyboard having a plurality of modes;
  a gesture module that receives an input gesture from a user, the input gesture detected on a surface of the information handling device by a gesture detector, the gesture detector comprising a capacitive sensor operatively coupled to a border surrounding the electronic display, the border located outside a touch-sensitive area of the electronic display and within a same plane of the electronic display, the input gesture comprising a tapping gesture; and
  a mode module that changes a mode of the interactive interface in response to the received tapping gesture, wherein, without providing an indication to a user of which side of the information handling device to interact with to change the mode of the interactive interface, the mode of the interactive interface is changed from a first mode to a second mode in response to the tapping gesture detected on a top side of the border according to an orientation of the information handling device as held by the user, and the mode of the interactive interface is changed from the second mode to the first mode in response to the tapping gesture detected on a bottom side of the border according to the orientation of the information handling device as held by the user, the top side being opposite the bottom side.

10. The apparatus of claim 9, wherein the input gesture further comprises a sliding gesture on a side of the border such that a sliding gesture in a first direction changes the first mode to the second mode and a sliding gesture in a second direction changes the second mode to the first mode, the first direction being opposite the second direction.

11. The apparatus of claim 9, further comprising a detector enabling module configured to one of enable and disable detection of the input gesture, wherein the gesture detector is selectively turned on and off.

12. A program product comprising a computer readable storage medium storing machine readable code executable by a processor to perform:

presenting an interactive interface on an electronic display of an information handling device, the interactive interface comprising a virtual keyboard having a plurality of modes;

receiving an input gesture from a user, the input gesture detected on a surface of the information handling device by a gesture detector, the gesture detector comprising a capacitive sensor operatively coupled to a border surrounding the electronic display, the border located outside a touch-sensitive area of the electronic display and within a same plane of the electronic display, the input gesture comprising a tapping gesture; and changing a mode of the interactive interface in response to the received tapping gesture, wherein, without providing an indication to a user of which side of the information handling device to interact with to change the mode of the interactive interface, the mode of the interactive interface is changed from a first mode to a second mode in response to the tapping gesture detected on a top side of the border according to an orientation of the information handling device as held by the user, and the mode of the interactive interface is changed from the second mode to the first mode in response to the tapping gesture detected on a bottom side of the border according to the orientation of the information handling device as held by the user, the top side being opposite the bottom side.

* * * * *